Jan. 10, 1967   R. F. McGIVERN   3,296,699
PHOTOGRAMMETRIC STEREO MAP PLOTTERS
Filed Dec. 28, 1964   3 Sheets-Sheet 1

ROBERT F. McGIVERN
INVENTOR.

BY Frank C. Parker

ATTORNEY

Jan. 10, 1967  R. F. McGIVERN  3,296,699
PHOTOGRAMMETRIC STEREO MAP PLOTTERS
Filed Dec. 28, 1964  3 Sheets-Sheet 2
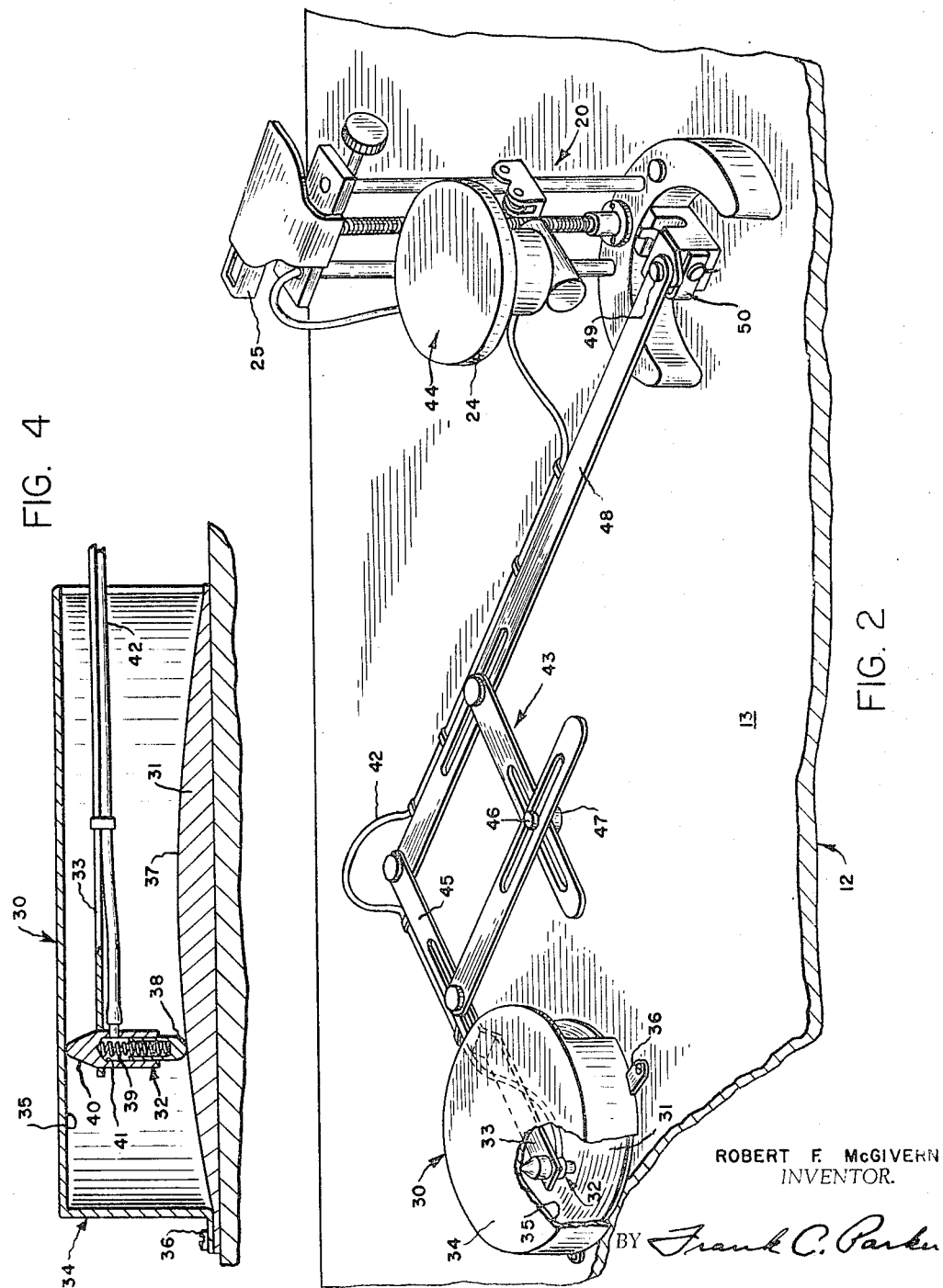
ROBERT F. McGIVERN
INVENTOR.
BY Frank C. Parker
ATTORNEY Jan. 10, 1967  R. F. McGIVERN  3,296,699
PHOTOGRAMMETRIC STEREO MAP PLOTTERS
Filed Dec. 28, 1964  3 Sheets-Sheet 3
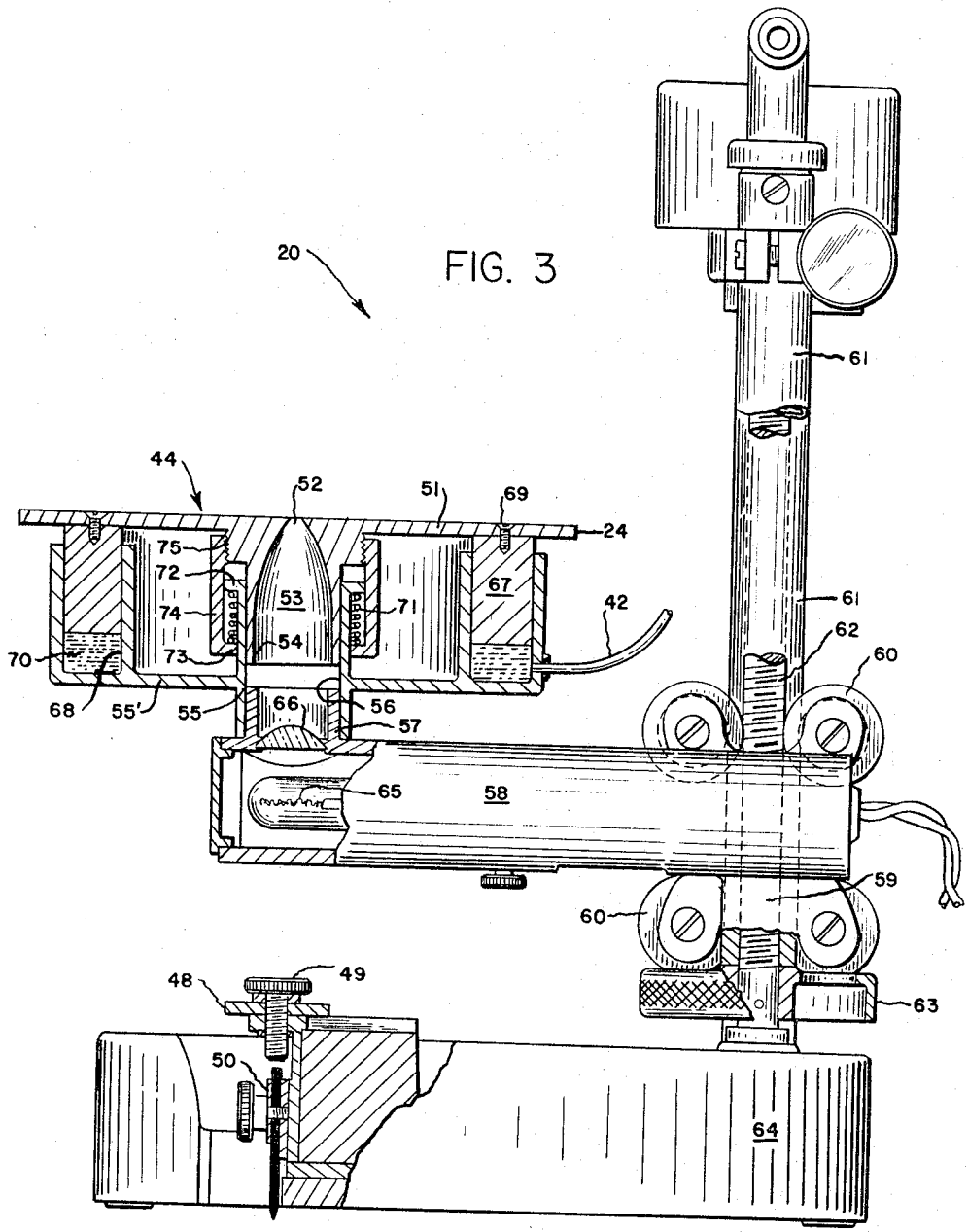
ROBERT F. McGIVERN
INVENTOR.
BY Frank C. Parker
ATTORNEY

3,296,699
PHOTOGRAMMETRIC STEREO MAP PLOTTERS
Robert F. McGivern, Irondequoit, N.Y., assignor to Bausch & Lomb Incorporated, Rochester, N.Y., a corporation of New York
Filed Dec. 28, 1964, Ser. No. 421,372
8 Claims. (Cl. 33—1)

The present invention relates to improvements in photogrammetric stereo map plotters and more particularly it relates to means for correcting for earth curvature in the stereo model.

Currently, the photogrammetric art has progressed toward the use of high altitude and/or wide angle photography resulting in greater areas being covered on a single aerial photograph. The resulting stereo models contain a sufficient number of square miles so that the effect of earth curvature is significant and must be taken into consideration when compiling topographic maps from photographs.

Although earlier proposals have been made for compensating for earth curvature, such proposals involve mechanisms which are too costly and usually such mechanisms cannot readily be adjusted or modified to accommodate different mapping scales or else they require mechanical attachment to the mapping projector.

It is an object of the present invention to provide improved means for correcting the earth curvature in a stereo model, said means being easy to accommodate to a plurality of mapping scales with resultant increase in the accuracy of map production.

A further object is to provide such a device by uncomplicated and low-cost mechanism which is easily attachable to a photogrammetric stereo-plotter, which is accessible for quick servicing and is reliable in operation.

Further objects and advantages are to be found in the arrangement and form of the parts of said mechanism and in the details of construction thereof as described in the specification herebelow taken together wtih the accompanying drawings, wherein:

FIG. 2 is a perspective view showing the earth curvature corrector mechanism operatively connected to a tracing table;

FIG. 3 is a side elevation partly in section and broken away of said tracing table embodying the present invention; and FIG. 4 is a midsectional view of the actuator member of the device shown in FIG. 2, partly broken away.

Figure 1:
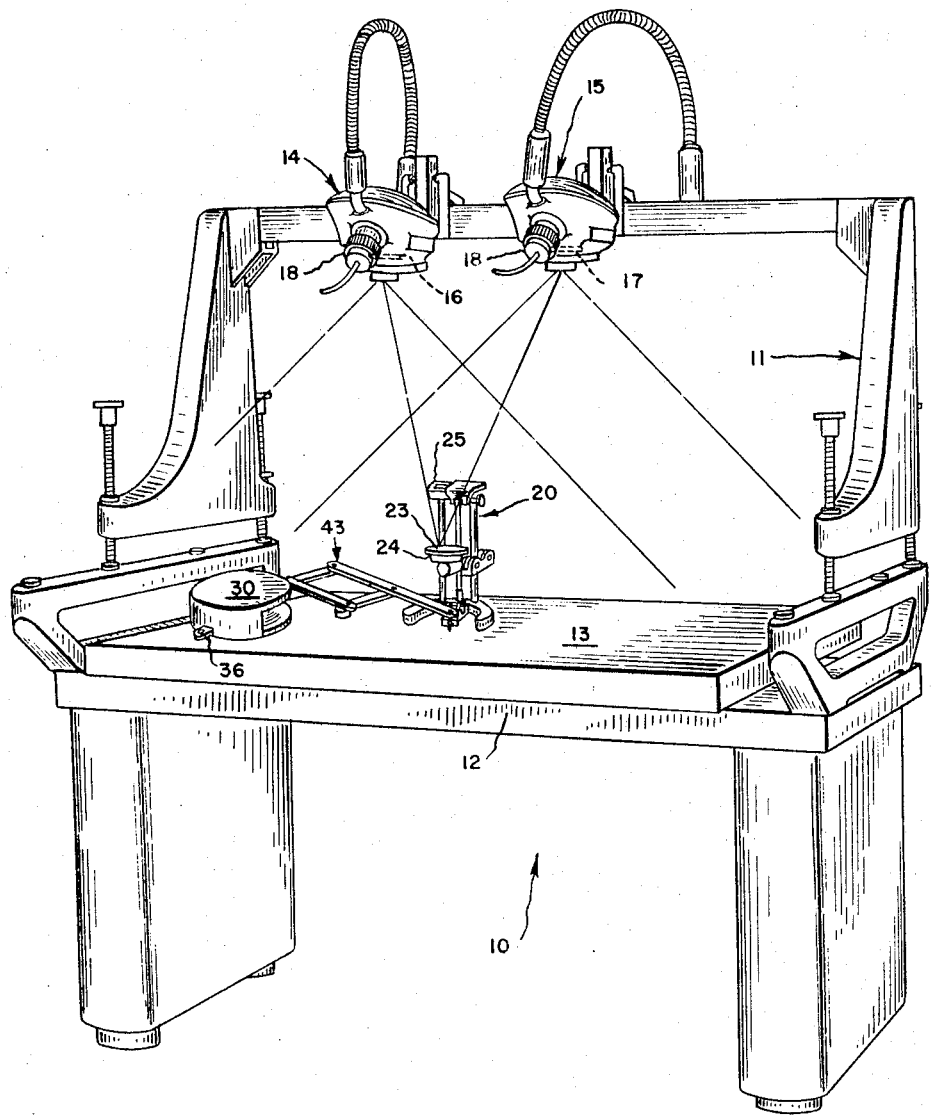
FIG. 1 is a general perspective view showing one form of the present invention applied to a photogrammetric map projection apparatus.

A preferred form of the present invention is shown in FIG. 1 of the drawings wherein a photogrammetric stereo map plotter is indicated generally by numeral 10. Said stereo map plotter 10 is characterized by a supporting frame or superstructure 11 which is erected on a mapping base 12 having a mapping surface 13.

On the supporting frame 11 is carried a pair of projectors 14 and 15 in which a pair of stereo-diapositives 16 and 17 are held respectively. Each said diapositive is illuminated by an individual lamp and light condensing system 18 which transilluminates the diapositives so that individual projection lenses, not shown, aligned therewith project a pair of stereo images of said diapositives into the space above the mapping surface 13.

Each of said projectors 14 and 15 is provided with three mutually perpendicular rotational and linear translational motions to permit the same relative spatial orientations of said projectors above the surface 13 as the orientation of the aerial camera above a datum such as sea level at the instant that the aerial photographs were exposed. When the projectors 14 and 15 are correctly oriented, the light rays from the common images on the two diapositives intersect at 23 in the space above surface 13. The intersection of all common image points establishes a three-dimensional spatial model in the space above mapping surface 13.

To determine the height of the intersection 23 above surface 13, a tracing table 20 is provided having a vertically movable platen 24. The top surface of the horizontal platen 24 is moved vertically into coincidence with an intersection point 23. The mapping surface 13, above which the elevations in the stereo model are measured by the tracing table 20, is a flat and level surface plate. By contrast, the sea level datum to which all map elevations are referenced is very closely spherical in shape. Therefore, stereo models that include a significant portion of the earth's surface require compensation for the earth curvature of the sea level datum.

According to the present invention, earth curvature correction means are provided for changing the height of the platen 24 without changing the reading of the elevation counter 25 on the tracing table 20 as said table is moved throughout the aforesaid stereo model. The amount of the vertical displacement of the platen 24 is made equal, at the scale of the model, to the displacement due to the earth curvature from the center of the model to the position or elevation of the tracing table 20 in the model.

Secondly, in addition to correcting for earth curvature, the corrector device may also be utilized to compensate for model distortions that approximate an earth curvature displacement curve. Said distortion may be compensated by varying the pantograph scale reduction setting from the computed values for earth curvature correction a sufficient amount to obtain the combined compensation for distortion in addition to earth curvature.

The aforesaid correction means is comprised of three mutually cooperating mechanisms which are: (1) an actuator and sensing mechanism for introducing the earth curvature correction factor; (2) a platen lifting mechanism formed on the tracing table 20 and operatively connected to respond to movements of said actuator mechanism; and (3) a pantograph linkage mechanism having a reduction factor and connected operationally so that motions of the tracing table 20 serve to move said actuator mechanism.

With reference to FIG. 4, the structure of one operative form of the actuator mechanism is there shown and it is generally designated by the numeral 30. Basically, the actuator mechanism 30 comprises a spherically surfaced plate 31 representing a section of the earth's surface to a very small scale, the radius thereof being proportional at least in part to the radius of the earth at a ratio which is dependent upon the scale of the map to be drawn on the map surface 13. The actuator mechanism 30 further comprises a sensing member 32 which is suitably fixed on the end 33 of a movable pantograph arm so as to be moved across the spherical cam plate 31 thereby. Over the spherical plate 31 is secured a shallow cover 34 having a flat horizontal wall which provides a planar undersurface 35 parallel to the mapping surface 13. Said cover 34 is secured to the cam plate 31 by suitable means such as screws 36.

In order to sense changes in vertical height of any point on the spherical surface 37 on cam plate 31, a contact element 38 is provided in the sensing member 32. Said element is forced against surface 37 by a coil spring 39 which coincidentally forces the upper end 40 of the sensing member against the surface 35 of the cover 34. The contact element 38 is built in the form of a piston which operates in a bore 41 in member 32 to displace a liquid contained therein. As shown jointly in FIGS. 2, 3 and 4, displacements of said liquid are communicated through a liquid filled flexible tube 42 to the aforesaid platen lifting mechanism to be described hereinafter.

As aforementioned, a pantograph linkage mechanism 43 is connected between the actuating or sensing mechanism 30 and the platen lifting mechanism which is designated generally by the numeral 44 as shown in FIG. 3. The pantograph mechanism 43 comprises an arm 45 having attached at its free end 33 the aforesaid sensing member 32, and one of the corner bolts 46 is attached to a stationary base 47 so that movements of the long arm 48 cause motion in reduced amount of arm 45. The ratio of the lengths of the arms 45 and 48 to each other, as shown in FIG. 2, matches the ratio of the scale of the map to the portion of surface 37 which is utilized. At the end of the arm 48 a pivot stud 49 is provided which is threaded into the pencil chuck 50 of the tracing table 20 and is aligned therewith.

With regard to the structure and arrangement of the platen lifting mechanism 44 as shown in FIG. 3, the platen per se is designated by said numeral 24. At the center of platen 24 is provided a small aperture 52 which opens into a truncated open ended chamber 53 having light reflective walls. Said chamber is formed in the shape of a somewhat cylindrical and downwardly elongated extension 54 which is formed on the underside of the platen 24.

For providing a vertically adjustable mounting for said platen 24, a stationary upstanding mast 55 is provided having a smooth inner cylindrical surface 56 wherein the exterior surface of the said extension 54 is slidably fitted. Said mast 55 is suitably secured to the outer diameter of a fixed position lens cell 57 in an erect position, said lens cell being a part of the usual horizontal support arm 58 of the tracing table 20. The arm 58 is fixed to and forms a part of the conventional cross-slide 59 which is mounted on suitable rollers 60 on a pair of vertical mounting rods 61 so that the cross-slide and the platen 24 carried thereon may be moved vertically. Vertical motion thereof is provided by a threaded spindle 62 having a handwheel 63 fixed thereto and mounted rotatably by suitable mechanism in the base 64 of the tracing table 20.

Illumination of the aperture 52 is provided by a lamp 65 which is housed in the horizontal arm 58 and the light therefrom is concentrated by a condensing lens 66 into a concentrated beam in the vicinity of said aperture 52 within the chamber 53. Said condensing lens is fixed in any preferred manner such as cementing in the aforesaid lens cell 57 in alignment with lamp 65.

Means for lifting the platen 24 for effecting compensation or correction of the curvature of the earth are provided as heretofore mentioned, the lifting being accomplished in response to displacements of the contact member 38 in the sensing member 32. Said lifting means is preferably constructed in the form of a hydraulic jack, the particular form here disclosed having a ring-shaped piston 67 which is slidably fitted into a parallel-sided annular cylinder or channel 68, said channel forming the peripheral part of a cup-like member having a base plate 55' which is preferably integrally formed with the mast 55. On the upper surface of the piston 67 is secured the platen 24 in any suitable manner such as the screws 69.

The channel 68 constitutes a reservoir and is filled with a suitable fluid 70 which is acted on remotely by the sensing member 32 through the interconnected conductor 42. For seating or urging the ring-like piston 67 against the fluid 70, an expansion spring 71 is provided which bears forcibly at its opposite ends against flanges 72, 73 which are formed respectively on the mast 55 and on a spring cage 74 which is secured in any preferred manner such as threads 75 to the platen extension 54.

With regard to the operation of the photogrammetric apparatus 10 embodying the present invention, the following procedure is required in setting up for its use. The tracing table 20 is positioned horizontally such that it is in the geometric center of the stereoscopic model (normally half way between the photo centers on a line connecting the two photo centers). The pantograph 43 is set for the proper reduction ratio based on the scale of the model, the ratio of the surface areas of the hydraulic pistons 38 and 67 and the radius of curvature of the spherical plate 31. With the pantograph connected to the tracing table 20 and the tracing table positioned in the center of the stereoscopic model, the actuator mechanism 30 is shifted horizontally such that the contact member 38 on the sensing member 32, which is attached to the pantograph, is at the high point on the spherical plate 31. The apparatus is then positioned and adjusted to automatically compensate for earth curvature as the tracing table is moved throughout the stereoscopic model.

From the foregoing, it will be apparent that there is here provided an effective and automatic device for compensating the earth curvature in a stereo model, said device being adaptable to a variety of stereomapping apparatus because of its adjustable features, and furthermore being a low-cost device which is easily serviced. Although only certain forms of the present invention have been shown and described in detail, other forms and arrangements are possible and changes and substitutions may be made therein without departing from the spirit of the invention as defined in the appended claims.

I claim:

1. An earth curvature correction device for a photogrammetric stereo map plotter having a tracing table platen whereon a stereo image is formed and having a vertically adjustable mounting bracket for carrying said platen at a predetermined elevation above a mapping surface, means for slightly varying the elevation of said platen in proportion to an earth curvature correction factor, said means having in combination a lifting device operatively positioned between said platen and said mounting bracket for changing the vertical distance therebetween by an amount proportionate to said factor, a spherical cam member fixedly mounted adjacent to the border of said mapping surface, an actuator mechanism including a movable sensing member which lies in contact with said cam member and is displaced in a vertical direction thereby as said member is moved from side to side thereover, said member being operatively connected to actuate said lifting device, a pantograph linkage characterized by a long operating arm and a short operating arm, said arms being operatively connected respectively to said tracing table and said element whereby the vertical displacement of said element by said cam causes a correctional adjustment in the elevation of said platen.

2. An earth curvature correction device for a photogrammetric stereo map plotter having a tracing table platen whereon a stereo image is formed and having a vertically adjustable bracket on which said platen is supported at a nominal specified elevation above a mapping surface, said device comprising a hydraulic lifting mechanism including an interfitting piston and cylinder, one of which is connected to said platen and the other is connected to said bracket, said lifting mechanism functioning to apply a small earth curvature correctional vertical movement to said platen, a spherical cam which is constructed with an earth curvature correction factor therein, said cam being mounted in a stationary position adjacent to the border of said mapping surface, a variable ratio pantograph having a long operating arm at one end and a short operating arm at the other end, the long arm being connected to said tracing table and the short arm being guided by the pantograph to move across the spherical surface of said cam, a hydraulic sensing mechanism fixed to said short arm and including an interfitted erect piston and cylinder, one of which moves in contact with said cam and the other of which is fixed to said short arm and includes means which are operatively constructed to compel the short arm to travel in a single plane parallel to the mapping surface, and a hydraulic operating connection for conducting a fluid and extending between the first hydraulic lifting mechanism and the last-named cylinder whereby operation of the sensing mechanism by said cam causes the first hydraulic lifting mechanism to raise or lower said platen corresponding to the earth correction factor.

3. In a photogrammetric stereo map plotter characterized by a tracing table having a platen whereon a stereo image is projected, said table resting on a mapping surface, said platen being carried by a horizontal bracket which is vertically adjustable to position the platen at a plurality of elevations corresponding to terrain elevations, means for correcting said elevations by a height factor proportional to the curvature of the earth, said means having in combination, lifting means operatively connected between said bracket and platen for lifting the platen by small amounts, a spherical cam incorporating an earth curvature correction factor therein, said cam being mounted in a stationary position on said mapping surface, a variable ratio pantograph having a long operating arm at one end and a short operating arm at the other end, the pantograph being operatively constructed and arranged so that when the long arm is connected to said tracing table the movement thereof causes the short arm to move over said cam, second means for maintaining the end of the short operating arm at a constant operating height above said mapping surface, third means for sensing the differences in vertical distance between said height and various points on said cam, and an operative connection extending between the last said means and said lifting means to transmit said earth curvature correction factor from said cam to said lifting means.

4. An earth curvature correction device as set forth in claim 2 further characterized by said piston being fixed to the underside of said platen, and said cylinder being open on its upper end so as to form a fluid reservoir, and a base plate secured in a fixed position on said bracket and fixed to the bottom of said cylinder and acting as a support therefor.

5. An earth curvature correction device as set forth in claim 4 further characterized by said piston having an inner cylindrical surface and an outer cylindrical surface which are coaxial so as to form a ring type of piston, and said cylinder comprises two erect circular walls which are concentric and are fitted slidably to receive said ring type piston therein.

6. In an earth curvature correction device for a photogrammetric stereo map plotter having a tracing table platen whereon a stereo image is formed and having a vertically adjustable bracket on which said platen is carried at a nominal specified elevation above a mapping surface, means for slightly varying the elevation of said platen by a distance which is proportional to an earth curvature correction factor, said means including a condenser lens cell having a tubular part fixed in upright position adjacent to the outer end of said bracket, a hollow upright mast and an interior cylindrical surface formed thereon which is fitted onto said tubular part so as to support said mast, a circular base plate formed horizontally near the lower end of said mast, a pair of concentrically spaced annular walls formed erectly on the peripheral portion of said base plate, a pair of cylindrical and parallel spaced surfaces formed on the inner sides of said annular walls and constituting an annular fluid receptacle, a ring type of piston fixed onto the under surface of said platen, a pair of cylindrical and parallel surfaces formed on the opposite sides of said piston and slidably fitted within the surface of said annular walls, a central dependent elongated extension formed on the lower side of said platen, a cylindrical surface formed on the exterior of said extension, said surface being fitted within the interior cylindrical surface of said mast, a light reflecting truncated wall formed in said extension defining a somewhat pyramidal opening which communicates with a central aperture in said platen to conduct light through said aperture, a spherical cam shaped to incorporate an earth curvature correction factor therein, said cam being mounted in a stationary position near the border of said mapping surface, a variable ratio pantograph having a long operating arm at one end and a short operating arm at the other end, the long arm being connected to the tracing table and the short arm being guided by the pantograph to move across the cam, a hydraulic sensing member fixed to said short arm and including an interfitted piston and cylinder, one of which moves in contact with said cam and the other of which is fixed to said short arm and includes means which are operatively constructed to compel the short arm to travel in a single plane parallel to the mapping surface, and a hydraulic operating connection extending between said last cylinder and said annular fluid receptacle whereby movements of the sensing mechanism are transmitted to said lifting mechanism.

7. In an earth curvature correction device for a photogrammetric stereo map plotter having a tracing table platen whereon a stereo image is formed and having a vertically adjustable bracket on which said platen is carried at a nominal specified elevation above a mapping surface, means for slightly varying the elevation of said platen by a distance which is proportional to an earth correction factor, said means including a condenser lens cell having a tubular part fixed in upright position adjacent to the outer end of said bracket, a hollow upright mast and an interior cylindrical surface formed thereon which is fitted onto said tubular part so as to support said mast, a circular base plate formed horizontally near the lower end of said mast, a pair of concentrically spaced annular walls formed erectly on the peripheral portion of said base plate, a pair of cylindrical and parallel spaced surfaces formed on the inner sides of said annular walls and constituting an annular fluid receptacle, a ring type of piston fixed onto the under surface of said platen, a pair of cylindrical and parallel surfaces formed on the opposite sides of said piston and slidably fitted within the surface of said annular walls, a central dependent elongated extension formed on the lower side of said platen, a cylindrical surface formed on the exterior of said extension, said surface being fitted within the interior cylindrical surface of said mast, a light reflecting truncated wall formed in said extension defining a somewhat pyramidal opening which communicates with a central aperture in said platen to conduct light through said aperture, a spherical cam shaped to incorporate an earth curvature correction factor therein, said cam being mounted in a stationary position near the border of said mapping surface, a variable ratio pantograph having a long operating arm at one end and a short operating arm at the other end, the long arm being connected to the tracing table and the short arm being guided by the pantograph to move across the cam, a hydraulic sensing member fixed to said short arm and including an interfitted piston and cylinder, one of which moves in contact with said cam and the other of which is fixed to said short arm and includes means which are operatively constructed to compel the short arm to travel in a single plane parallel to the mapping surface, a hydraulic operating connection extending between said last cylinder and said annular fluid receptacle whereby movements of the sensing mechanism are transmitted to said lifting mechanism, a cylindrical spring cage which is secured at its upper end to said central extension, said cage being spaced from and being parallel to said mast, an internal flange formed on the lower end of said cage and an out-turned flange formed on the upper end of said mast, and an expansion spring positioned in the space between said cage and mast and bearing forcibly at its opposite ends against the inturned flange and the outturned flange to urge said piston against the fluid in said cylinder.

8. An earth curvature correcting device for a photogrammetric stereo map plotter according to claim 3 and further characterized by said second means comprising a stiff walled cover which is secured to said mapping surface over said cam, a rigid planar bottom surface for said cover spaced from and parallel to said mapping surface, and an upwardly projecting contact portion on said sensing means formed above the pantograph arm of contacting said rigid bottom surface.

References Cited by the Examiner
UNITED STATES PATENTS

| | | | |
|---|---|---|---|
| 2,321,033 | 6/1943 | Lewis | 33—1 |
| 2,448,484 | 8/1948 | Cavalcanti | 33—20 |
| 2,727,432 | 12/1955 | Kelsh | 33—20 X |
| 2,833,178 | 5/1958 | Kelsh | 33—20 X |
| 2,901,941 | 9/1959 | Brumley | 33—1 X |

LEONARD FORMAN, *Primary Examiner.*